United States Patent
Sun et al.

(10) Patent No.: US 11,093,582 B2
(45) Date of Patent: Aug. 17, 2021

(54) METHOD FOR CALCULATING AXIS DEVIATION OF ROTOR ASSEMBLY BASED ON END FACE RUNOUT MEASUREMENT

(71) Applicant: DALIAN UNIVERSITY OF TECHNOLOGY, Dalian (CN)

(72) Inventors: Qingchao Sun, Dalian (CN); Xin Liu, Dalian (CN); Yichao Gao, Dalian (CN); Yunlong Wang, Dalian (CN)

(73) Assignee: Dalian University of Technology, Liaoning (CN)

( * ) Notice: Subject to any disclaimer, the term of this patent is extended or adjusted under 35 U.S.C. 154(b) by 27 days.

(21) Appl. No.: 16/652,838

(22) PCT Filed: Sep. 12, 2018

(86) PCT No.: PCT/CN2018/105195
§ 371 (c)(1),
(2) Date: Apr. 1, 2020

(87) PCT Pub. No.: WO2020/051793
PCT Pub. Date: Mar. 19, 2020

(65) Prior Publication Data
US 2020/0320160 A1    Oct. 8, 2020

(51) Int. Cl.
*G06F 17/16*    (2006.01)
(52) U.S. Cl.
CPC .................... *G06F 17/16* (2013.01)

(58) Field of Classification Search
CPC .......... F05B 2260/821; F05B 2260/966; F03D 13/00; F03D 17/00
USPC .......................................................... 708/520
See application file for complete search history.

(56) References Cited

U.S. PATENT DOCUMENTS

2021/0140406 A1* 5/2021 McClure ................... H02P 9/06

FOREIGN PATENT DOCUMENTS

| CN | 202083333 U | 12/2011 |
| CN | 103776365 A | 5/2014 |
| CN | 103934659 A | 7/2014 |
| CN | 105135993 A | 12/2014 |
| EP | 0970600 B1 | 11/2002 |

* cited by examiner

*Primary Examiner* — Tan V Mai
(74) *Attorney, Agent, or Firm* — Muncy, Geissler, Olds & Lowe, P.C.

(57) ABSTRACT

A method for calculating axis deviation of rotor assembly based on end face runout measurement comprises three parts: calculation of three contact points, a triangle judgment criterion and a homogeneous coordinate transformation algorithm of a deviation matrix. Based on the measured end face runout data in production practice, the method realizes the prediction of axis deviation before assembly, improves the concentricity of rotors after assembly, also greatly increases the one-time acceptance rate of assembly and has important practical guiding significance for axis prediction as well as assembly phase adjustment and optimization in the assembly process of aero-engine rotor pieces.

1 Claim, 2 Drawing Sheets

METHOD FOR CALCULATING AXIS DEVIATION OF ROTOR ASSEMBLY BASED ON END FACE RUNOUT MEASUREMENT

TECHNICAL FIELD

The present invention belongs to a method for calculating axis deviation of rotor assembly, and can be applied to axis prediction, assembly phase optimization and assembly guidance in the assembly process of important parts and assemblies such as high pressure compressor rotor, high pressure turbine disk and low pressure rotor assembly of aero-engine.

BACKGROUND

As a very important link in equipment manufacturing process, assembly has a direct impact on the performance and reliability of products. For aero-engine rotor assembly, it is important to ensure that the concentricity after assembly meets requirements. To reduce the time and labor cost caused by trial-and-error assembly, and to improve the concentricity after assembly, the assembly phase prediction and optimization are important. To improve the one-time acceptance rate of assembly and reduce the part wear and time cost generated during repeated disassembly and assembly, it is necessary to find the relationship between the topography of the end face before assembly and the axis deviation generated after assembly of each stage disk in combination with the actual assembly process in a factory.

Determining axis deviation of rotor assembly is an important step applied in assembly phase prediction and optimization. Fitting plane method is a method for calculating assembly stacking deviation by fitting plane equations through least square fitting based on the runout data of a measured rotor end face. This processing algorithm is simple in procedure and can grasp the morphological characteristics of two joint surfaces as a whole. However, since the error between the fitting plane of the rotor joint surfaces with "double high points" or irregular topography and the source data is large, the accuracy of the predicted axis deviation is difficult to be guaranteed. Actual rotary centerline method is a method for predicting axis deviation adopted by Axiam, and the essence thereof is to explore the actual rotary axis generated after assembly by measuring the runout data at the end face topography of all stage disks, and carrying out assembly phase adjustment and optimization based on this axis. This method is mainly applied in foreign countries, and the key technology has not been introduced into China. This method has high prediction accuracy, but restricted by the advanced part and component manufacturing level in China, the phenomenon of part out-of-tolerance is widespread. There is no basic aligning and tilt adjusting process for a roundness meter in the application process of this method, so it is difficult to adapt to the production and assembly process of aero-engine rotors in China.

The present invention proposes a method for calculating axis deviation after assembly based on end face runout measurement of flange joint surfaces before rotor assembly without consideration of normal elastic deformation. This method can be used for realizing the prediction of axis deviation for each stage disk at a certain assembly phase, and then further realizing the optimization and adjustment of the assembly phase, which has important practical significance.

SUMMARY

In order to meet the concentricity requirements in the assembly process of aero-engine rotor pieces, the present invention proposes a calculation method for calculating the assembly deviation among all stages in combination with engineering practice and based on the measured runout data of each stage disk of the rotor pieces.

The calculation principle of this method is as follows:

Under rigidity hypothesis, considering a certain installation phase in the assembly of two stage disks, the relationship between end face runout and deviation amount is calculated. Because three points that are not collinear determine a plane, the core of the method is to find three initial contact points of two stage disks under rigid conditions, and determine the deviation amount of the previous stage disk relative to the next stage disk through the three points. It should be pointed out that, the machining process makes the surface topography of the part have the feature of macro-continuity, i.e., the feature that although the runout value measured by adjacent measuring points is discrete, the fluctuation of each measuring point is small in a small range, and is continuous in a large scale. Thus, the found three points can represent the position of the actual initial contact point under rigid contact.

In this method, a roundness meter is used for measuring the end face runout of flange joint surfaces of each stage flange first, then the end face runout data of every two adjacent stage disks is used as an input parameter, and a relative deviation matrix of two adjacent stage disks is obtained through calculation by this algorithm. By multiplying the deviation matrices of every two adjacent stage disks, a total deviation matrix reflecting the concentricity of an assembly can be obtained. It should be pointed out that adjusting different assembly phases will result in different deviation matrices, but the number of assembly phases of two adjacent stage disks is limited due to the restriction of bolt holes, positioning holes and the like. When the total deviation matrix calculated by this method is used as an evaluation parameter, an optimal assembly phase can be found before assembly to greatly reduce the number of repeated disassembly and assembly and improve the one-time acceptance rate of assembly.

In the figure: the upper end face and the lower end face of the rotor A are respectively $A_{O2}$ and $A_{O1}$; the upper end face and the lower end face of the rotor B are respectively $B_{O2}$ and $B_{O1}$; The axis deviation of the rotor B relative to the rotor A caused by two uneven contact surfaces $A_{O2}$ and $B_{O1}$ in the assembly process is shown in the figure.

Figure 1:
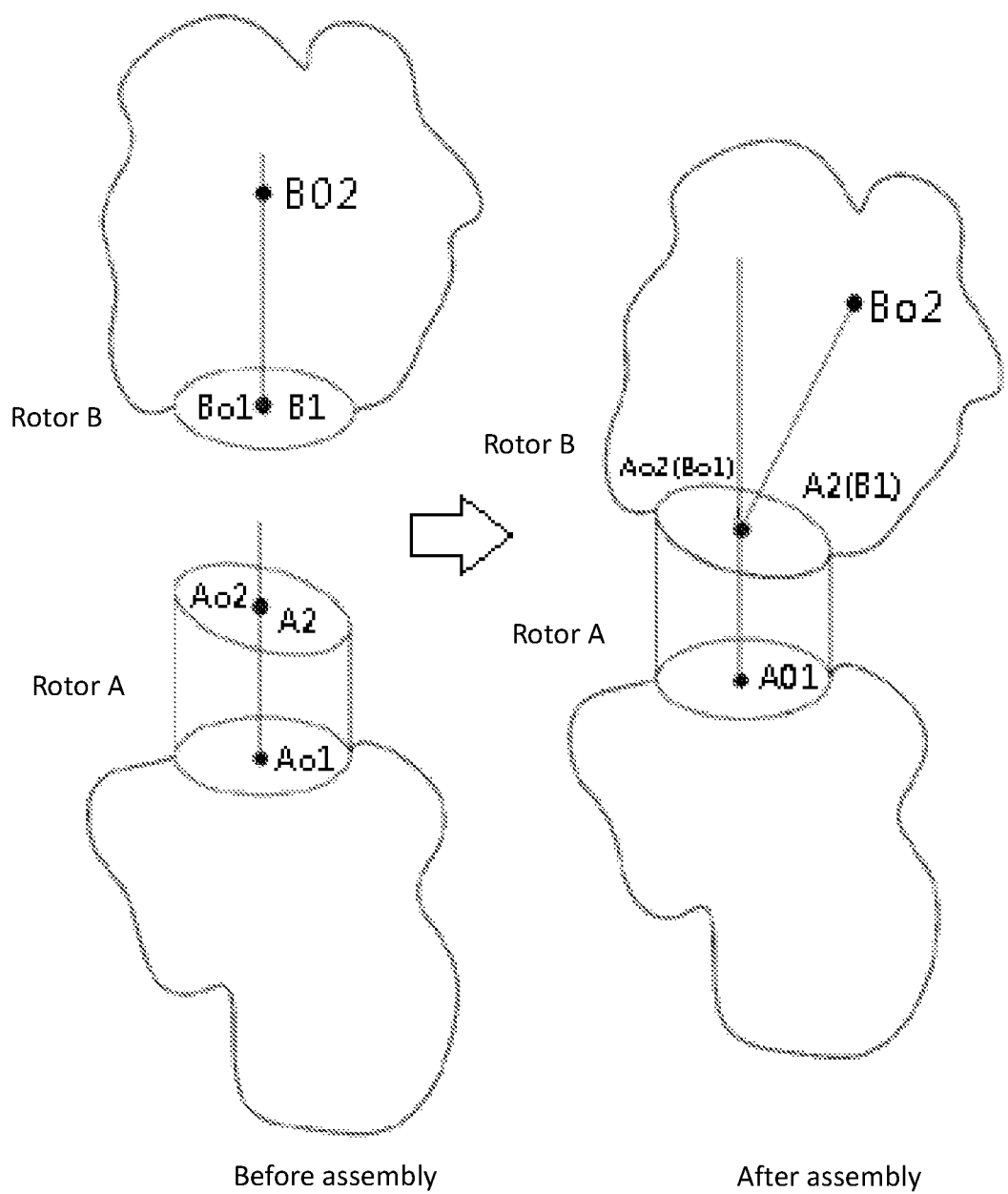
FIG. 1 is a schematic diagram of the influence of end face runout on assembly deviation.
Figure 2:
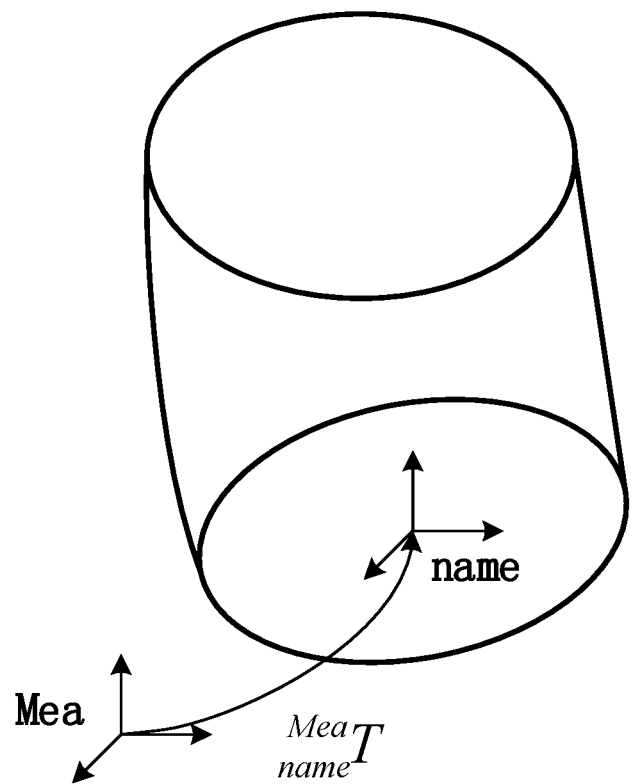
Figure 2:
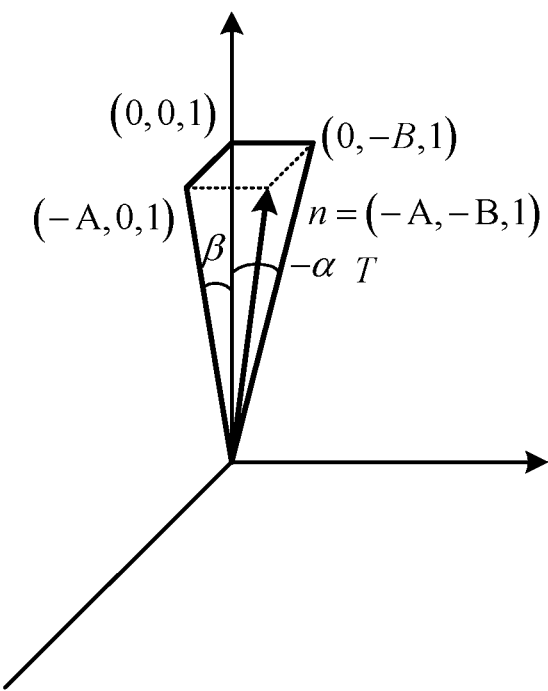

FIG. 2 is a schematic diagram of homogeneous coordinate transformation matrix.

DETAILED DESCRIPTION

Specific calculation mode of this method is further described below in combination with accompanying drawings and the technical solution.

EMBODIMENTS

A method for calculating axis deviation of rotor assembly based on end face runout measurement comprises the following steps:

step A: for two adjacent stage disks, the centers of the upper face and the lower face of the rotor A are respectively $A_{O2}$ and $A_{O1}$, and the centers of the upper face and the lower face of the rotor B are respectively $B_{O2}$ and $B_{O1}$; the matching surfaces of two rotors are the upper end face $A_2$ of the rotor A and the lower end face $B_1$ of the rotor B; two contact surfaces $A_2$ and $B_1$ are respectively represented by a matrix; the form of the data is a ring, i.e., $A(\alpha,z)$ and $B(\alpha,z)$; the runout value z at a certain point at $\alpha$ is represented by a polar coordinate representation method; the position of the center O of a circle in a global coordinate system is O(0,0), and the rotor radius R is known; the upper end face $A_2$ of the rotor A is used as a base surface to find three points of the lower end face $B_1$ of the rotor B when in contact with the three points of $A_2$; the plane after contact can be determined by the three points;

step B: calculation of the first contact point: the lower rotor A is fixed, and the upper rotor B is gradually translated downward to approach, i.e., the lower end face $B_1$ of the rotor B is translated to approach the upper end face $A_2$ of the rotor A; an assumption that the first contact point $c_1$ is produced after the translation distance is d is made; then, $c_1$ has two points in which the actual distance of two end faces is closest; it should be pointed out that, $c_1$ refers to two points which come into contact at first, not necessarily one of the three final contact points;

this stage is a translational contact process; the input is end face runout data $A(\alpha,z)$ and $B(\alpha,z')$ of the upper end face $A_2$ and the lower end face $B_1$; two closest points are found, i.e., the first contact point $c_1$; two sets of end face runout data are summed here to obtain a data matrix $SUM(\alpha,z'')$ after summing; a point corresponding to a maximum value of the end face runout sum of the data matrix $SUM(\alpha,z'')$ is found, i.e., the first contact point, that is, $\alpha$ corresponding to the maximum value $z''_{max}$ of $z''$, which is the first contact point $c_1(\alpha)$;

$$\text{calculation formula: } z''=z+z'; \quad (1)$$

step C: calculation of the second contact point: the lower end face $B_1$ of the rotor B rotates around the point $c_1$ to continue to approach the upper end face $A_2$ of the rotor A; the rotation direction is a connection direction between $c_1$ and the center O of the circle of the lower end face $B_1$; after rotating by a certain angle $\theta_1$, the second contact point $c_2$ is produced;

this stage is a single point rotational contact process; the input is the maximum distance $z''_{max}$, the first contact point $c_1(\alpha)$, and the end face runout data $A(\alpha,z)$ and $B(\alpha,z')$ of the upper end face $A_2$ and the lower end face $B_1$; according to the contact point $c_1(\alpha)$ obtained in the first stage, the rotation direction can be determined as the connection direction between the contact point $c_1(\alpha)$ and the center O' of the circle of the lower end face $B_1$, and the rotation faces the center O' of the circle; an angle $\theta_i$ corresponding to the projection of the contact remaining distance of each set of points in the rotation direction can be calculated according to the maximum distance $z''_{max}$, and the end face runout data $A(\alpha,z)$ and $B(\alpha,z')$ of the upper end face $A_2$ and the lower end face $B_1$ obtained in the first stage; and a point corresponding to a minimum value $\theta_{i_{min}}$ of $\theta_i$ is found, which is the second contact point $c_2(\alpha_2)$;

$$\text{calculation formula: } d = z''_{max} - z - z'; \quad (2)$$

$$\theta_i = \arctan\left(\frac{d}{l'}\right); \quad (3)$$

step D: calculation of the third contact point: the lower end face $B_1$ rotates in the direction of the perpendicular bisector connecting point $c_1$ and point $c_2$ towards the center O of the circle, and continues to approach the upper end face $A_2$; after rotating by a certain angle $\theta_2$, the third contact point $c_3$ is produced;

this stage is a connecting rotary contact process; the input is the minimum value $\theta_{i_{min}}$ of $\theta_i$, the second contact point $c_2(\alpha_2)$, the maximum distance $z''_{max}$, the first contact point $c_1(\alpha)$, and the end face runout data $A(\alpha,z)$ and $B(\alpha,z')$ of the upper end face $A_2$ and the lower end face $B_1$; according to the contact points $c_1(\alpha)$ and $c_2(\alpha_2)$ obtained in the second stage, the rotation direction can be determined as the perpendicular bisector direction of the connection between the contact points $c_1(\alpha)$ and $c_2(\alpha_2)$, and the rotation faces the center O" of the circle; an angle $\theta_{i2}$ corresponding to the projection of the contact remaining distance of each set of points in the rotation direction can be calculated according to the maximum distance $z''_{max}$, and the end face runout data $A(\alpha,z)$ and $B(\alpha,z')$ of the upper end face $A_2$ and the lower end face $B_1$ obtained in the first stage and the minimum value $\theta_{i_{min}}$ of $\theta_i$ and the second contact point $c_2(\alpha_2)$ obtained in the second stage; and a point corresponding to a minimum value $\theta_{i2_{min}}$ of $\theta_{i2}$ is found, which is the third contact point $c_3(\alpha_3)$;

$$\text{calculation formula: } d_2 = z''_{max} - z - z' - d \times l_i/l'; \quad (4)$$

$$\theta_{i2} = \arctan\left(\frac{d_2}{l''}\right); \quad (5)$$

step E: triangle judgment: the obtained three points $c_1$, $c_2$ and $c_3$ are used to judge whether the three contact points conform to a triangle judgment criterion; if so, the triangle judgment procedure is ended to obtain the three contact points; if not, a next step is conducted;

explanation of the triangle judgment criterion: the validity of the three points can be judged according to whether a triangle formed by the three points in a local coordinate system includes the center of the circle; if the center of the circle is included in the triangle, then the triangle is an acute triangle; the significance of the triangle judgment criterion is to avoid the situation that the three contact points are very close due to high (or low) measuring points in a small area; this situation does not conform to the contact stability under the rigidity hypothesis; in actual contact, the middle point (which is also a point corresponding to an obtuse angle) of a minor arc formed by the three points may be out of contact, which is not in line with the actual situation and also indicates that the selected assembly phase is not suitable;

calculation method: internal angles of the triangle by connecting the three points $c_1$, $c_2$, $c_3$ can be used to judge: if the three internal angles are all acute angles, then O" is within the triangle, the three points meet the actual situation, and the coordinates of the three contact points can be determined; otherwise, O" is not in the triangle; the middle point of the minor arc formed by the three points needs to be abandoned; the contact point needs to be found again; and step F needs to be executed;

step F: this stage is a stage of re-finding the third contact point; the input of this stage is: the first contact point $c_1(\alpha)$, the second contact point $c_2(\alpha_2)$ and the third contact point $c_3(\alpha_3)$; based on the actual situation, when the center O" of the circle is not within the triangle formed by the three points $c_1$, $c_2$, $c_3$, the upper piece B cannot be stabilized and continues to tilt to find another point; at the same time, one of the three contact points is out of contact, that is, the point in the middle of the three points is out of contact; the rotation direction can be determined as the perpendicular bisector direction of the connection between the other two points; the rotation faces the center O" of the circle; step D is re-executed; two points which are not out of contact are used as new contact points $c_1(\alpha)$ and $c_2(\alpha_2)$ for calculation; and then step E is executed to judge the triangle until the triangle judgment criterion is met to obtain a final contact point;

step G: after the three contact points are determined, axis deviation is vector multiplication of two axis deviations of the rotor B when the second contact point and the third contact point are calculated in step C and step D; in addition, if step F is repeatedly executed when the triangle judgment of step E is executed, the deviation matrices in each execution of step E are substituted into the multiplication when the global axis deviation is calculated; as shown in FIG. 2, the homogeneous coordinate transformation matrix of the measuring surface can be represented as:

$$^{Mea}_{name}T = \begin{pmatrix} 1 & 0 & \beta & u \\ 0 & 1 & -\alpha & v \\ -\beta & \alpha & 1 & z \\ 0 & 0 & 0 & 1 \end{pmatrix} \quad (6)$$

wherein u and v are translation amounts; z is section height; $\beta$ and $\alpha$ are equivalent to A and B in plane normal vector $(-A,-B,1)$; from the view of values, $-A$ component is a rotation angle around y-axis, and $-B$ component is the negative value of the rotation angle around x-axis; according to the calculation method shown in formula (6), each axis deviation in step C, step D and step F is represented by a coordinate transformation matrix $H_i$; if n coordinate transformations are produced in the whole process, then the coordinate transformation matrices are multiplied according to the transformation order corresponding to the execution steps to obtain the global axis deviation transformation matrix: $H=H_1''H_n$;

the global axis deviation transformation matrix H can be transformed into two parameters of the axis deviation direction and the deviation size according to formula (6), which is a final result.

The invention claimed is:

1. A method for calculating axis deviation of rotor assembly based on end face runout measurement, comprising the following steps:

step A: for two adjacent stage disks, the centers of the upper face and the lower face of a rotor A are respectively $A_{O2}$ and $A_{O1}$, and the centers of the upper face and the lower face of a rotor B are respectively $B_{O2}$ and $B_{O1}$; the matching surfaces of two rotors are the upper end face $A_2$ of the rotor A and the lower end face $B_1$ of the rotor B; two contact surfaces $A_2$ and $B_1$ are respectively represented with a matrix; the form of the data is a ring, i.e., $A(\alpha,z)$ and $B(\alpha,z)$; the runout value z at a certain point at $\alpha$ is represented by a polar coordinate representation method; the position of the center O of a circle in a global coordinate system is $O(0,0)$, and the rotor radius R is known; the upper end face $A_2$ of the rotor A is used as a base surface to find three points of the lower end face $B_1$ of the rotor B when in contact with the three points of $A_2$; the plane after contact is determined by the three points;

step B: calculation of the first contact point: the lower rotor A is fixed, and the upper rotor B is gradually translated downward to approach, i.e., the lower end face $B_1$ of the rotor B is translated to approach the upper end face $A_2$ of the rotor A; an assumption that the first contact point $c_1$ is produced after the translation distance is d is made; then, $c_1$ has two points in which the actual distance of two end faces is closest; $c_1$ refers to two points which come into contact at first, not necessarily one of the three final contact points;

this stage is a translational contact process; the input is end face runout data $A(\alpha,z)$ and $B(\alpha,z')$ of the upper end face $A_2$ and the lower end face $B_1$; two closest points are found, i.e., the first contact point $c_1$; two sets of end face runout data are summed here to obtain a data matrix $SUM(\alpha,z'')$ after summing; a point corresponding to a maximum value of the end face runout sum of the data matrix $SUM(\alpha,z'')$ is found, i.e., the first contact point, that is, $\alpha$ corresponding to the maximum value $z''_{max}$ of $z''$, which is the first contact point $c_1(\alpha)$;

calculation formula: $z''=z+z'$; (1)

step C: calculation of the second contact point: the lower end face $B_1$ of the rotor B rotates around the point $c_1$ to continue to approach the upper end face $A_2$ of the rotor A; the rotation direction is a connection direction between $c_1$ and the center O of the circle of the lower end face $B_1$; after rotating by a certain angle $\theta_1$, the second contact point $c_2$ is produced;

this stage is a single point rotational contact process; the input is the maximum distance $z''_{max}$, the first contact point $c_1(\alpha)$, and the end face runout data $A(\alpha,z)$ and $B(\alpha,z')$ of the upper end face $A_2$ and the lower end face $B_1$; according to the contact point $c_1(\alpha)$ obtained in the first stage, the rotation direction is as the connection direction between the contact point $c_1(\alpha)$ and the center O' of the circle of the lower end face $B_1$, and the rotation faces the center O' of the circle; an angle $\theta_i$ corresponding to the projection of the contact remaining distance of each set of points in the rotation direction can be calculated according to the maximum distance $Z''_{max}$, and the end face runout data $A(\alpha,z)$ and $B(\alpha,z')$ of the upper end face $A_2$ and the lower end face $B_1$ obtained in the first stage; and a point corresponding to a minimum value $\theta_{i_{min}}$ of $\theta_i$ is found, which is the second contact point $c_2(\alpha_2)$;

calculation formula: $d = z''_{max} - z - z'$; (2)

$$\theta_i = \arctan\left(\frac{d}{P}\right); \quad (3)$$

step D: calculation of the third contact point: the lower end face $B_1$ rotates in the direction of the perpendicular bisector connecting point $c_1$ and point $c_2$ towards the center O of the circle, and continues to approach the upper end face $A_2$; after rotating by a certain angle $\theta_2$, the third contact point $c_3$ is produced;

this stage is a connecting rotary contact process; the input is the minimum value $\theta_{i_{min}}$ of $\theta_i$, the second contact point $c_2(\alpha_2)$, the maximum distance $z''_{max}$, the first contact point $c_1(\alpha)$, and the end face runout data $A(\alpha,z)$ and $B(\alpha,z')$ of the upper end face $A_2$ and the lower end face $B_1$; according to the contact points $c_1(\alpha)$ and $c_2(\alpha_2)$ obtained in the second stage, the rotation direction is determined as the perpendicular bisector direction of the connection between the contact points $c_1(\alpha)$ and $c_2(\alpha_2)$, and the rotation faces the center O" of the circle; an angle $\theta_{i2}$ corresponding to the projection of the contact remaining distance of each set of points in the rotation direction can be calculated according to the maximum distance $z''_{max}$, and the end face runout data $A(\alpha,z)$ and $B(\alpha,z')$ of the upper end face $A_2$ and the lower end face $B_1$ obtained in the first stage and the minimum value $\theta_{i_{min}}$ of $\theta_i$ and the second contact point $c_2(\alpha_2)$ obtained in the second stage; and a point corresponding to a minimum value $\theta_{i2_{min}}$ of $\theta_{i2}$ is found, which is the third contact point $c_3(\alpha_3)$;

$$\text{calculation formula } d_2 = z''_{max} - z - z' - d \times l_i/l'; \quad (4)$$

$$\theta_{i2} = \arctan\left(\frac{d_2}{l''}\right); \quad (5)$$

step E: triangle judgment: the obtained three points $c_1$, $c_2$ and $c_3$ are used to judge whether the three contact points conform to a triangle judgment criterion; if so, the triangle judgment procedure is ended to obtain the three contact points; if not, a next step is conducted;

explanation of the triangle judgment criterion: the validity of the three points is judged according to whether a triangle formed by the three points in a local coordinate system includes the center of the circle; if the center of the circle is included in the triangle, then the triangle is an acute triangle;

calculation method: internal angles of the triangle by connecting the three points $c_1$, $c_2$, $c_3$ are used to judge: if the three internal angles are all acute angles, then O" is within the triangle, the three points meet the actual situation, and the coordinates of the three contact points are determined; otherwise, O" is not in the triangle; the middle point of the minor arc formed by the three points needs to be abandoned; the contact point needs to be found again; and step F needs to be executed;

step F: this stage is a stage of re-finding the third contact point; the input of this stage is: the first contact point $c_1(\alpha)$, the second contact point $c_2(\alpha_2)$ and the third contact point $c_3(\alpha_3)$; based on the actual situation, when the center O" of the circle is not within the triangle formed by the three points $c_1$, $c_2$, $c_3$, the upper piece B cannot be stabilized and continues to tilt to find another point; at the same time, one of the three contact points is out of contact, that is, the point in the middle of the three points is out of contact; the rotation direction is determined as the perpendicular bisector direction of the connection between the other two points; the rotation faces the center O" of the circle; step D is re-executed; two points which are not out of contact are used as new contact points $c_1(\alpha)$ and $c_2(\alpha_2)$ for calculation; and then step E is executed to judge the triangle until the triangle judgment criterion is met to obtain a final contact point;

step G: after the three contact points are determined, axis deviation is vector multiplication of two axis deviations of the rotor B when the second contact point and the third contact point are calculated in step C and step D; in addition, if step F is repeatedly executed when the triangle judgment of step E is executed, the deviation matrices in each execution of step E are substituted into the multiplication when the global axis deviation is calculated; the homogeneous coordinate transformation matrix of the measuring surface is represented as:

$$_{name}^{Mea}T = \begin{pmatrix} 1 & 0 & \beta & u \\ 0 & 1 & -\alpha & v \\ -\beta & \alpha & 1 & z \\ 0 & 0 & 0 & 1 \end{pmatrix} \quad (6)$$

wherein u and v are translation amounts; z is section height; $\beta$ and $\alpha$ are equivalent to A and B in plane normal vector $(-A,-B,1)$; from the view of values, $-A$ component is a rotation angle around y-axis, and $-B$ component is the negative value of the rotation angle around x-axis; according to the calculation method shown in formula (6), each axis deviation in step C, step D and step F is represented by a coordinate transformation matrix $H_i$; if n coordinate transformations are produced in the whole process, then the coordinate transformation matrices are multiplied according to the transformation order corresponding to the execution steps to obtain the global axis deviation transformation matrix: $H=\Pi_1{}^n H_n$;

the global axis deviation transformation matrix H is transformed into two parameters of the axis deviation direction and the deviation size according to formula (6), which is a final result.

\* \* \* \* \*